United States Patent
Kahn et al.

(10) Patent No.: US 8,064,759 B1
(45) Date of Patent: Nov. 22, 2011

(54) METHOD AND APPARATUS FOR MOTION-STATE BASED IMAGE ACQUISITION

(75) Inventors: Philippe Kahn, Aptos, CA (US); Arthur Kinsolving, Santa Cruz, CA (US)

(73) Assignee: DP Technologies, Inc., Scotts Valley, CA (US)

(*) Notice: Subject to any disclaimer, the term of this patent is extended or adjusted under 35 U.S.C. 154(b) by 57 days.

(21) Appl. No.: 12/424,492

(22) Filed: Apr. 15, 2009

(51) Int. Cl.
*G03B 17/18* (2006.01)
(52) U.S. Cl. .................................. 396/53; 396/50
(58) Field of Classification Search ............... 348/208.3; 396/20, 50, 52–53, 263, 335–338
See application file for complete search history.

(56) References Cited

U.S. PATENT DOCUMENTS

| | | | |
|---|---|---|---|
| 4,238,146 A * | 12/1980 | Kitamura et al. ............. | 396/239 |
| 5,192,964 A | 3/1993 | Shinohara et al. | |
| 5,430,480 A | 7/1995 | Allen et al. | |
| 5,708,863 A * | 1/1998 | Satoh et al. ................ | 396/52 |
| 5,717,611 A | 2/1998 | Terui et al. | |
| 5,790,490 A | 8/1998 | Satoh et al. | |
| 6,374,054 B1 * | 4/2002 | Schinner ..................... | 396/282 |
| 6,396,883 B2 | 5/2002 | Yang et al. | |
| 6,470,147 B1 | 10/2002 | Imada | |
| 6,628,898 B2 | 9/2003 | Endo | |
| 7,027,087 B2 | 4/2006 | Nozaki et al. | |
| 7,042,509 B2 | 5/2006 | Onuki | |
| 7,212,230 B2 | 5/2007 | Stavely | |
| 7,689,107 B2 * | 3/2010 | Enomoto ..................... | 396/53 |
| 7,705,884 B2 | 4/2010 | Pinto et al. | |
| 2002/0006284 A1 | 1/2002 | Kim | |
| 2002/0054214 A1 | 5/2002 | Yoshikawa | |
| 2002/0150302 A1 | 10/2002 | McCarthy et al. | |
| 2003/0151672 A1 | 8/2003 | Robins et al. | |
| 2004/0047498 A1 | 3/2004 | Mulet-Parada et al. | |
| 2004/0081441 A1 * | 4/2004 | Sato et al. ................... | 396/52 |
| 2004/0106958 A1 | 6/2004 | Mathis et al. | |
| 2004/0130628 A1 | 7/2004 | Stavely | |

(Continued)

FOREIGN PATENT DOCUMENTS

JP 7020547 A 1/1995

OTHER PUBLICATIONS

"PCT International Search Report and Written Opinion", PCT/US09/30223, (Feb. 23, 2009), 11 pages.

(Continued)

*Primary Examiner* — Clayton E LaBalle
*Assistant Examiner* — Leon W Rhodes
(74) *Attorney, Agent, or Firm* — Blakely, Sokoloff, Taylor & Zafman, LLP; Judith A. Szepesi

(57) ABSTRACT

A method comprising receiving an indication from a user that the user wishes to take a picture. The method further comprising receiving motion data for a camera device and analyzing the motion data to determine a motion state of the camera. The method further comprising acting based on the motion data. In one embodiment, acting on the motion data comprises providing feedback to the user regarding a time to take a photo, based on the motion data. In one embodiment, acting on the motion data comprises automatically taking a picture when the motion state is at a particular level. In one embodiment, acting on the motion data comprises automatically taking a picture when the camera is at a correct angle as determined by the motion data.

23 Claims, 10 Drawing Sheets

U.S. PATENT DOCUMENTS

| | | |
|---|---|---|
| 2004/0135898 A1 | 7/2004 | Zador |
| 2004/0247030 A1 | 12/2004 | Wiethoff |
| 2005/0078197 A1 | 4/2005 | Gonzales |
| 2005/0157181 A1 | 7/2005 | Kawahara et al. |
| 2005/0168587 A1 | 8/2005 | Sato et al. |
| 2005/0203430 A1* | 9/2005 | Williams et al. ............ 600/513 |
| 2005/0243178 A1 | 11/2005 | McConica |
| 2006/0029284 A1 | 2/2006 | Stewart |
| 2006/0257042 A1 | 11/2006 | Ofek et al. |
| 2007/0263995 A1* | 11/2007 | Park et al. ................. 396/50 |
| 2008/0030586 A1 | 2/2008 | Helbing et al. |
| 2008/0231713 A1* | 9/2008 | Florea et al. ............. 348/208.2 |
| 2008/0231714 A1 | 9/2008 | Estevez et al. |
| 2009/0017880 A1 | 1/2009 | Moore et al. |
| 2009/0067826 A1* | 3/2009 | Shinohara et al. ............ 396/50 |
| 2009/0174782 A1 | 7/2009 | Kahn et al. |

OTHER PUBLICATIONS

Ang, Wei Tech, et al, "Zero Phase Filtering for Active Compensation of Period Physiological Motion," Proc 1st IEEE / RAS-EMBS International Conference on Biomedical Robotics and Biomechatronics, Feb. 20-22, 2006, pp. 182-187.

Ricoh, "Advanced digital technology changes creativity," <http://www.ricoh.com/r_dc/gx/gx200/features2.html>, Accessed May 12, 2011, 4 pages.

Tech, Ang Wei, "Real-time Image Stabilizer," <http://www.mae.ntu.edu.sg/ABOUTMAE/DIVISIONS/RRC_BIOROBOTICS/Pages/rtimage.aspx>, Mar. 23, 2009, 3 pages.

* cited by examiner

METHOD AND APPARATUS FOR MOTION-STATE BASED IMAGE ACQUISITION

FIELD OF THE INVENTION

The present invention relates to image acquisition, and more particularly to using motion data from a camera device to assist in acquiring good quality images.

BACKGROUND

Cameras are becoming ubiquitous, as they are being integrated into more and more devices, from cell phones, to computers, to eye glasses. However, these cameras are often cheaper and more lightweight. This results in increased motion when a picture is taken.

In the prior art, complex systems have been developed to counter the results of such motion. These systems include gyroscopes and counter balance systems, floating lenses, and post processing systems. However, including these types of complex systems in a camera is very expensive.

SUMMARY

A method comprising receiving an indication from a user that the user wishes to take a picture. The method further comprising receiving motion data for a camera device and analyzing the motion data to determine a motion state of the camera. The method further comprising acting based on the motion data. In one embodiment, acting on the motion data comprises providing feedback to the user regarding a time to take a photo, based on the motion data. In one embodiment, acting on the motion data comprises automatically taking a picture when the motion state is at a particular level. In one embodiment, acting on the motion data comprises automatically taking a picture when the camera is at a correct angle as determined by the motion data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is for a motion state system. The system utilizes the motion state analysis of the camera to provide feedback, automatically acquire a picture, or both. This system is useful for a camera or video device. The motion state system is designed to enable a user to take a picture at the optimal motion state. In one embodiment, the user may provide feedback about the type(s) of motion he or she would prefer not to be included in the motion state assessment.

In one embodiment, the motion state system provides feedback. The feedback, in one embodiment, is audio feedback. In another embodiment, the feedback may be visual feedback. In one embodiment, the feedback is sufficiently simple that no training is required to utilize the feedback mechanism to take improved pictures. In one embodiment, the motion state system automatically acquires one or more images at the optimal motion states. In one embodiment, with a single activation, the user may select "multi-photo mode" to have the camera automatically take one or more photos, when the camera is at a good motion state. In one embodiment, the photos may be taken until a set number of photos have been acquired, until a period has elapsed, until the camera has traveled a certain distance, or some other criterion is met.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
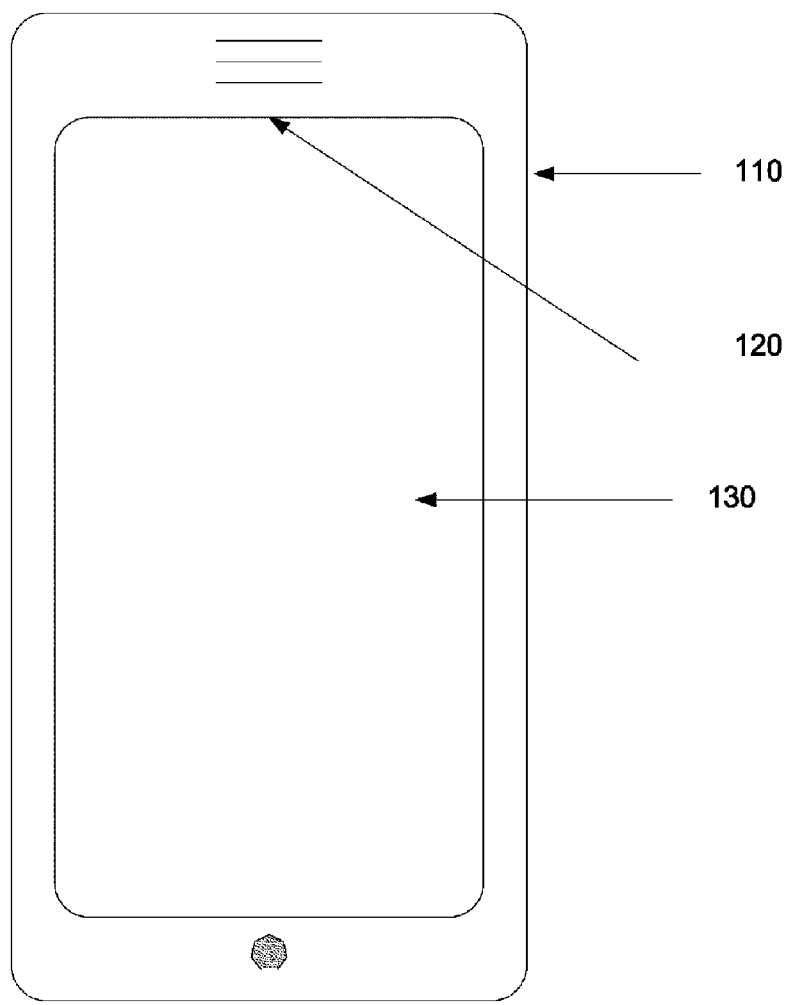
FIG. 1 is a diagram of one embodiment of a camera including a feedback mechanism.
Figure 8A:
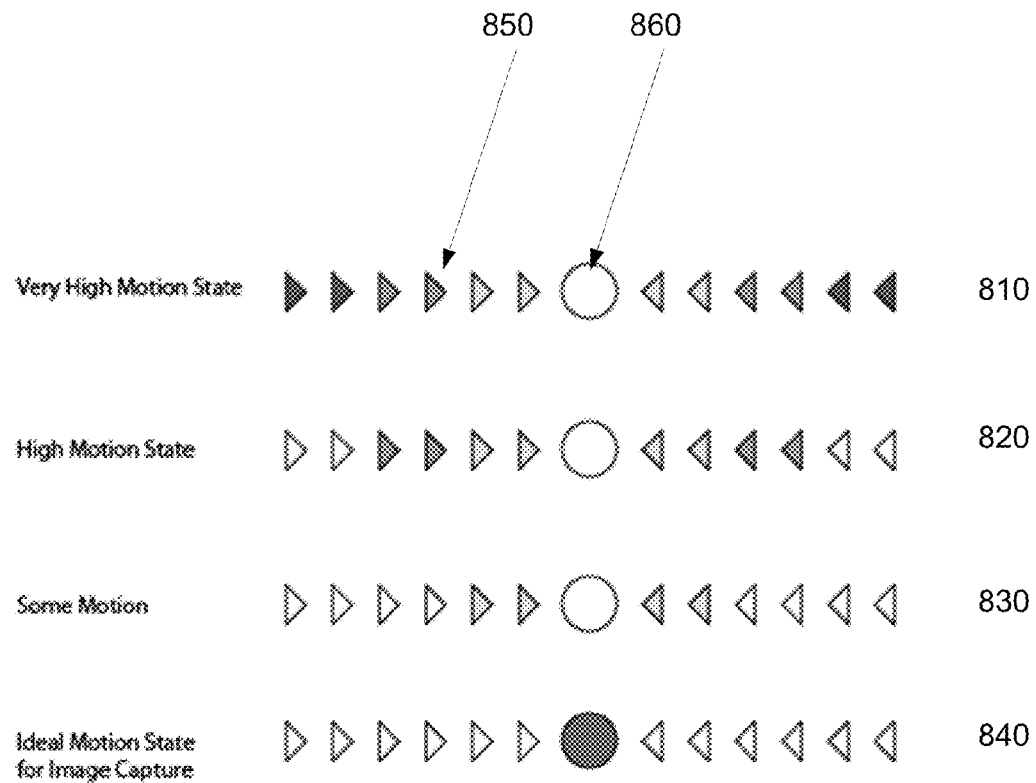
FIG. 8A shows illustrations of an exemplary visual feedback.

FIG. 1 is a diagram of one embodiment of a camera including a feedback mechanism. The camera in one embodiment includes a motion acquisition system (not shown). The motion acquisition system may be an accelerometer, multiple accelerometers, a gyroscope, or another system for acquiring motion data. The camera 110 includes, in one embodiment a speaker 120, and/or a visual display area 130. As cameras are being integrated into cellular phones, cameras with speaker capabilities are becoming more common. Almost all digital cameras have a screen which shows the currently framed image. A video feedback may be shown on the screen 135, or within the view finder (not shown). The visual feedback may be an arrow, focusing on a "target." The target is lit/colored/shown when the motion state of the camera indicates that it is a good time to take a picture. This exemplary feedback is shown in FIG. 8A. Alternatively, the visual feedback may be icons, colors, or other indicators of feedback. Alternative methods of providing feedback to the user may be used.

Figure 2:
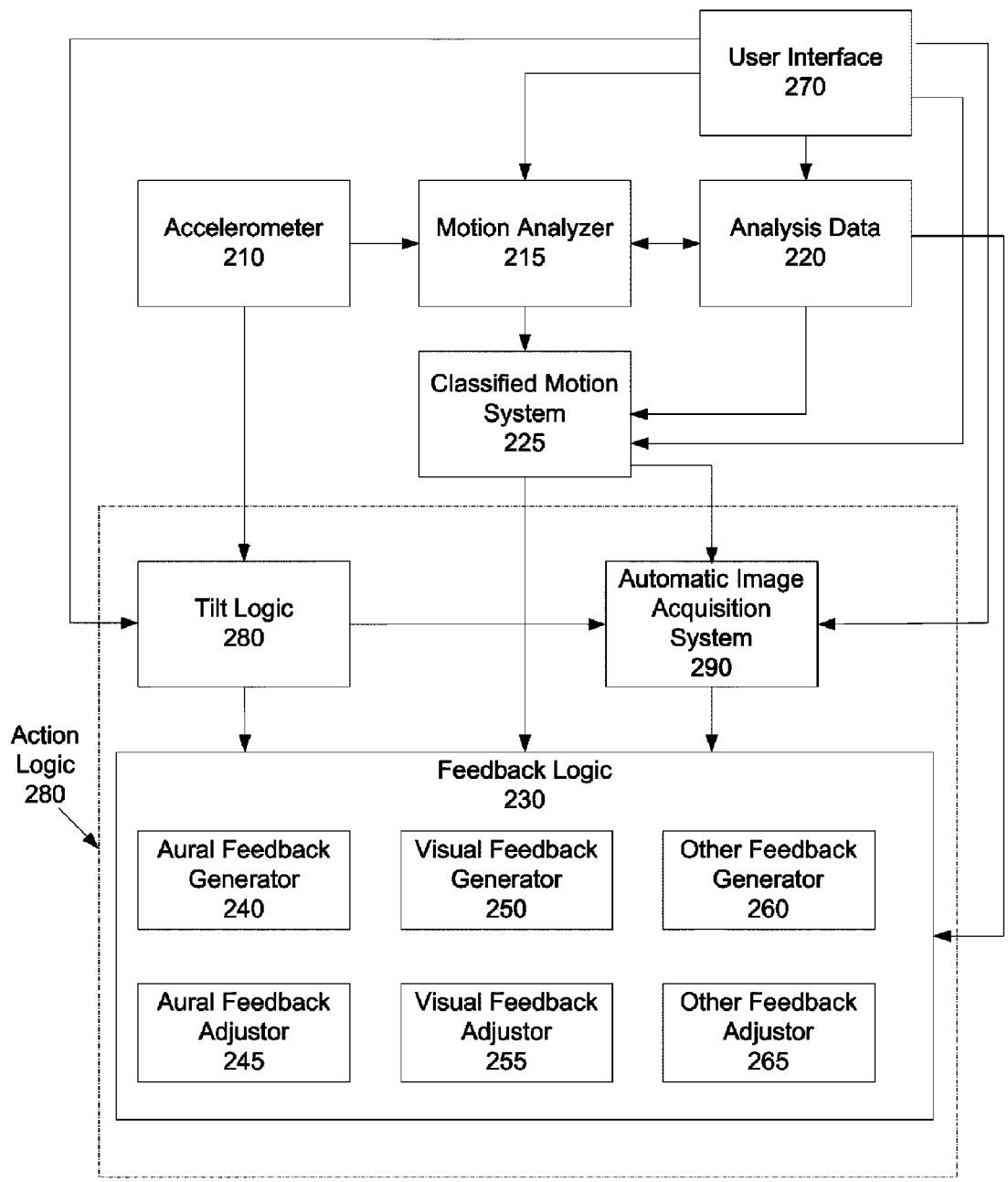
FIG. 2 is a block diagram of one embodiment of a motion state system.

FIG. 2 is a block diagram of one embodiment of a motion state system. The system in one embodiment includes an accelerometer 210, or another inertial motion detector. In another embodiment, the motion data is received from an external device. The accelerometer data is used by motion analyzer 215 to identify a level of motion. In one embodiment, the motion analyzer 215 further classifies the motion by motion type. In one embodiment, the motion analyzer 215 uses analysis data 220 for this determination.

In one embodiment, the motion analyzer 215 uses tables which categorize the motion as being voluntary and involuntary. In one embodiment, the motion analyzer 215 classifies the motion as rotations and translations with associated axes. The classified motion system 225 receives the processed motion data from motion analyzer 215. Processed motion data in one embodiment may be motion data that is separated into rotation/translation elements, motion data that is classified as involuntary motion, and/or motion data that has not been removed by user from evaluation. In one embodiment, the user can remove one or more motions from evaluation, via user interface 270. In one embodiment, motion may be removed by motion type, e.g. translation, rotation along a particular axis, etc.

When looking at the effect of motion on image quality, there is a hierarchy of the types of motion that effect image/video quality sorted by most disruptive to least:
1. Rotation about X and Z axes is worst and causes the most blur due to the geometry.
2. Rotation about the Y axis has an intermediate effect. It causes less blur effect at the center of the image and increasing blur as it radiates outwards.
3. Translations along the X, Y, and Z axes have the least effect on image blur.

The motion analysis system is designed to provide feedback to enable the taking of a picture/video with minimal acceleration and rate of change of the acceleration. In one embodiment, the system weights motion types at the top of the list more heavily than those at the bottom. In one embodiment, the motion analysis system applies a weighting system so that motions of types 1 and 2 have more influence in the feedback, e.g. make more noise and more LEDs light up for example.

In one embodiment, motion data may be obtained from a single linear 3 axis accelerometer. In this case, it is difficult to differentiate rotations about X, Y and Z from translations along these axes. Thus, in one embodiment, the system watches for acceleration and the rate of change in acceleration. The feedback system trains the user to minimize these types of motions evenly across all 3 axes. Thus, in one embodiment, no axis weighted more than another.

If the system has two linear accelerometers, in one embodiment they would be placed ideally on a diagonal so that the system can differentiate rotations about X, Z and Y from translations along these axes. This would enable the system to give more weight to rotations than to translations. The same could be achieved with a gyroscope or another type of movement sensing device. Thus, depending on the number of accelerometers or other motion sensing devices, and the motion analysis available, motion analyzer 215 classifies the motion.

Classified motion system 225 uses analysis data 220 to identify, in one embodiment, the amplitude (severity) of the motion. In one embodiment, the classified motion system 225 further identifies the type of motion. In one embodiment, this motion referred to as "classified motion" provides in one embodiment a total motion value associated with all detected motion. In one embodiment, the classified motion weights different types of motion differently, as discussed above.

User feedback logic 230 provides data to the user to enable the user to improve the picture being taken. The feedback may be aural feedback (e.g. tones, chords, sounds, words, or absence of sounds, etc.), visual feedback (e.g. images, colors, icons, etc.) or another type of feedback. Each type of feedback is associated with a feedback type generator 240, 250, 260, and adjustor 245, 255, 265. The feedback indicator generator provides data to the user, which the user can utilize to take a better picture. In one embodiment, aural feedback generator 240 generates a chord which reflects the level, and in one embodiment, type of motion. Alternatively, sounds or even words may be used to provide feedback. In one embodiment, silence indicates a low level of motion at which a picture can be taken, and the sound level indicates a high level of motion. Adjustor 245 adjusts the tone as the motion state changes.

Visual feedback generator 250 may provide visual feedback reflecting the magnitude and/or type of motion. In one embodiment, the feedback is shown in the view finder. In one embodiment, the feedback is shown on the LCD display. Alternatively, the feedback may be shown in both. The feedback, in one embodiment shows arrows, as illustrated in FIG. 8A. The more of the arrows 850 are colored the further from the target level of motion the user is. When the user is at the target level of motion, it is indicated by target 860 being colored, in one embodiment. In one embodiment, the colors of the arrows may indicate motion type. In another embodiment, the color of the arrows indicates the severity of motion, with the target in a green tone, the nearby arrows in lighter green, shading into yellow, and the outer arrows red. In one embodiment, when only green arrows are lit, the motion state is sufficiently low to provide a quality image.

In one embodiment, the configuration is such that at a default state only a level of motion is shown. However, users may adjust to also show motion type in the feedback, in one embodiment. This is more useful for advanced users.

Returning to FIG. 2, there may be other types of feedback that may be utilized. In one embodiment, the user may adjust the type of feedback being provided, through user interface 270. In one embodiment, user interface 270 enables the user to select the feedback path, as well as to exclude certain types of motion, or otherwise alter what causes feedback to be provided.

In one embodiment, the motion state data may further be used to automatically acquire images, using image acquisition system 290. Image acquisition system 290 enables a user, with a single activation, to take one or more images at the optimal motion state. In one embodiment, the user may activate the automatic image acquisition system 290, which provides feedback and acquires images whenever the optimal motion state is reached, until either a set number of images have been acquired, a set time has elapsed, a set distance has been traveled by the device, etc. In one embodiment, the feedback system may be used to indicate to the user when pictures are being taken.

In one embodiment, the motion state data may further be used by angle logic 280. Angle logic 280, in one embodiment, enables the use of the motion data to determine whether the camera is at a particular angle, referred to as "tilt determination." In one embodiment, through user interface 270, the user can set the angle for tilt determination. For example, in one embodiment, the user may place the device on any surface and indicate that the angle of the surface is the "tilt basis." Thus, whenever the camera is at the angle matching that surface, the system would determine that the camera is at the correct angle. In one embodiment, angle logic 280 may trigger automatic image acquisition system 290, to trigger the automatic taking of one or more images when the camera is at the correct angle. In one embodiment, angle logic 280 may send data to user feedback logic 230, to provide feedback about the camera tilt to the user.

Generally, the feedback mechanism is designed to be unobtrusive, and to enable the user to take a picture or video without interruption. In one embodiment, if the user is taking a video including sound, the aural feedback is turned off, to ensure that no feedback noise is recorded on the video. In one embodiment, the system may automatically change to a visual feedback from an aural feedback when the user is recording a video.

Figure 3:
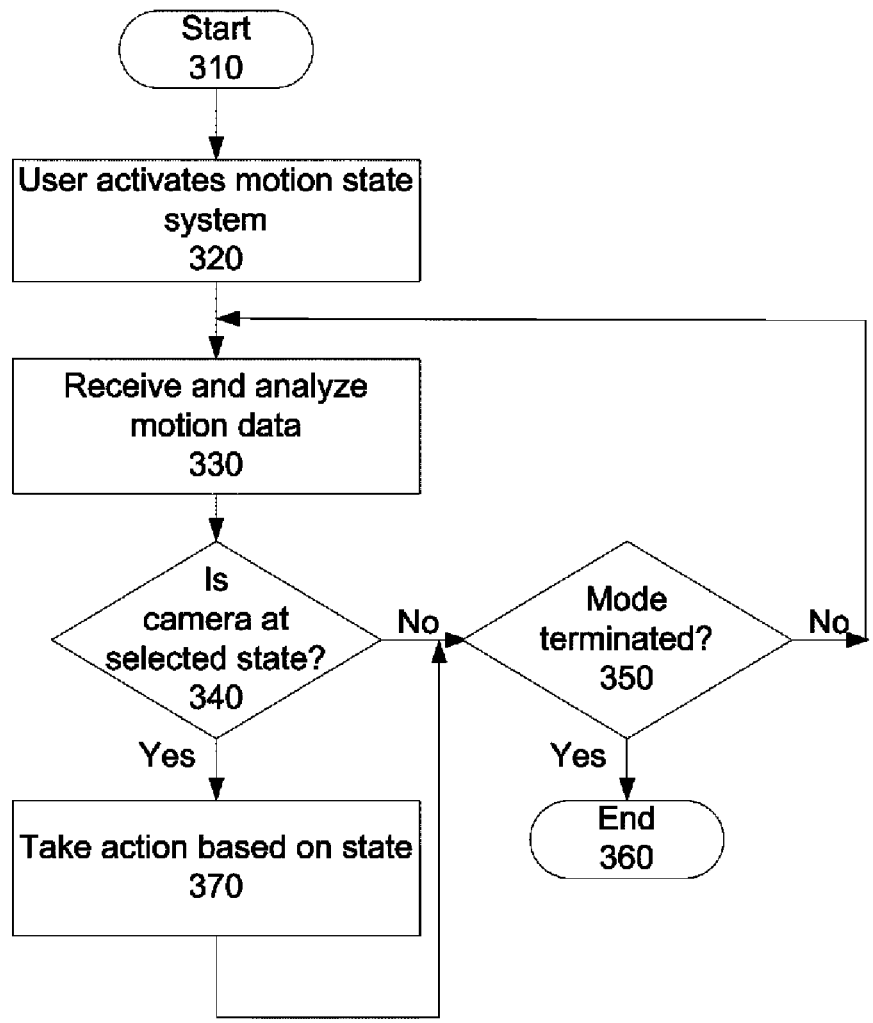
FIG. 3 is an overview flowchart of one embodiment of using motion state data in a camera.

FIG. 3 is an overview flowchart of using the motion state system. The process starts at block 310.

At block 320, the user activates the motion state system. In one embodiment, the user activation includes specifying which type of system to activate. In one embodiment, the motion state system is automatically activated when the user turns on the camera. In one embodiment, there is a simple interface to activate the multi-photo system. In one embodiment, there is a simple interface to activate the tilt mode. In one embodiment, the user may activate one or more of these systems together, or separately, or may set the camera to automatically activate one or more of these systems.

At block 330, the system receives and analyzes the motion data. The motion data analysis in one embodiment classifies the motion. In one embodiment, the motion data analysis determines a level of inadvertent motion. The motion data analysis determines the levelness of the camera, in one embodiment.

At block 340, the process determines whether the camera is in the selected state. In one embodiment, the selected state is an optimal motion state. In one embodiment, the selected state is at a correct angle with respect to a reference surface.

If not, at block 350, the process determines whether the mode has been terminated. If so, the process ends at block 360. Otherwise, the process returns to continue receiving and analyzing motion data, at block 330.

If the camera is at the selected state, the process continues to block 370. At block 370, an action is taken based on the state. In one embodiment, the action is to provide the feedback indicator that the camera is in a state in which taking a photo would be good. In one embodiment, the action is to take a photo or record a video. The process then continues to block 350, to determine whether the mode has been terminated.

Figure 4:
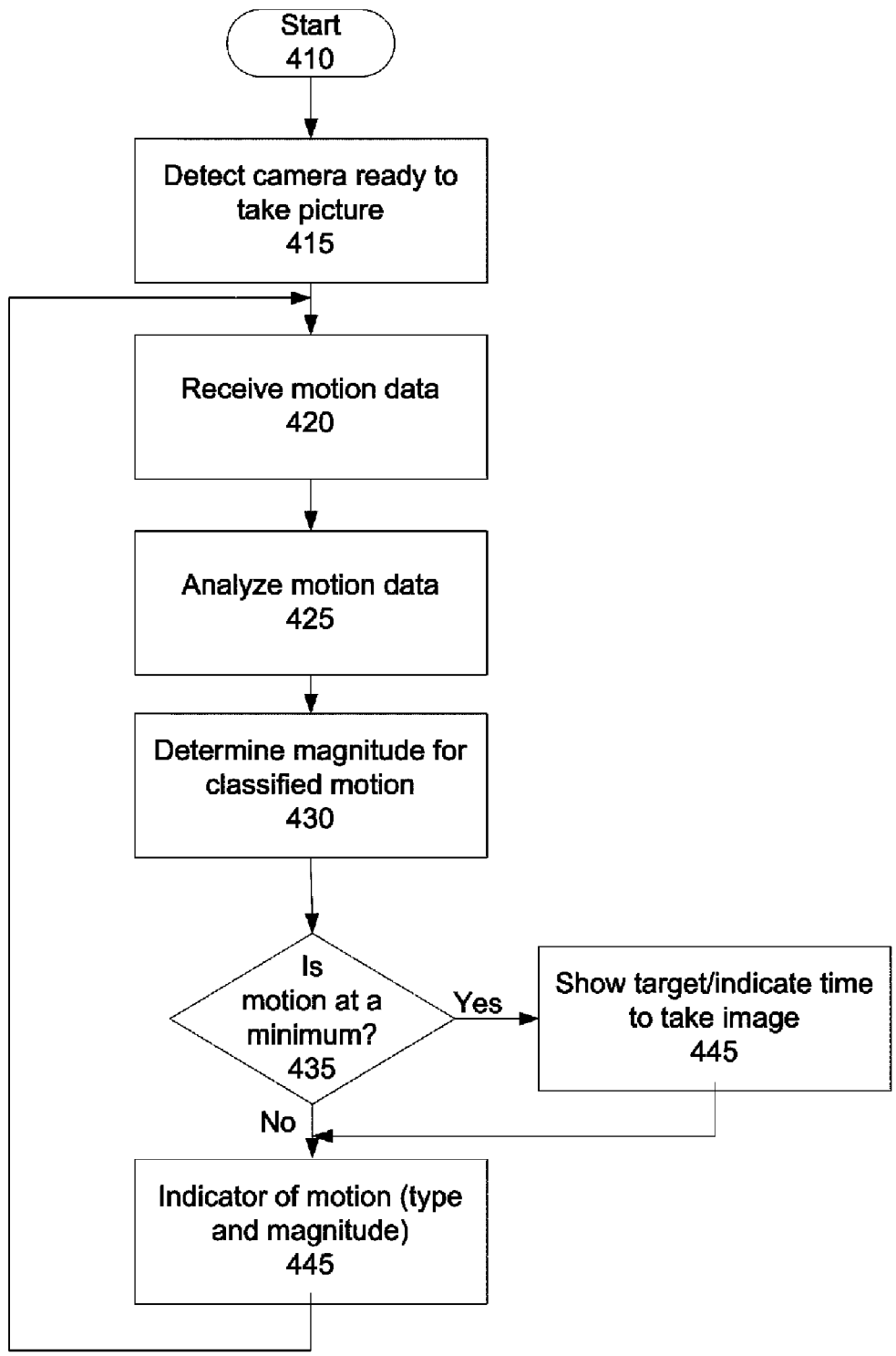
FIG. 4 is a flowchart of one embodiment of using the motion state system to provide feedback.

FIG. 4 is a flowchart of one embodiment of using the motion state system. The process starts at block 410. In one embodiment, the system is activated when a camera is turned on. In a camera system, whenever the camera is on (powered) the system is available. In another device such as a cell phone or mobile computing system which has a camera available but also has other functionality, the system is turned on when the camera function is activated.

At block 415, the system detects that the camera is ready to take a picture or record video. At block 420, motion data is received. In one embodiment, for devices that do not have an otherwise active accelerometer, the system immediately upon the start-up of the camera functionality, enables the accelerometer or other inertial sensor. For devices which have an always-available accelerometer/inertial sensor, this is not necessary. For those devices, the application requests the motion data—in one embodiment the full, unprocessed motion data—from the accelerometer/inertial sensor.

At block 425, the motion data is analyzed. In one embodiment, the motion data analysis is a two step analysis. First, the system identifies each motion type present in the system. Then, at block 430, a motion magnitude is associated with each type of motion. In one embodiment, the user may be able to configure the system to operate in a moving vehicle such as a bicycle, car, airplane, train, etc. In one embodiment, when such motion is detected or identified, the system motion attributable to the forward motion of the vehicle is removed from inadvertent motion analysis.

In one embodiment, the motion magnitude (or severity) is only analyzed for inadvertent motion. In one embodiment, the types of inadvertent motion may include muscle tremor, myoclonic twitches, motion associated with pressing a button, heart beat related micro motions, breathing related motions, or other physiological caused or externally caused motion. In one embodiment, various types of motions are weighted, so that an overall motion magnitude reflects the likely effect of the motion on image quality.

At block 435, the process determines whether motion is at a minimum. In one embodiment, motion may be at a local minimum for a particular user at a value that would not be considered a minimum for another user. For example, for a user with a stabilizer, the minimum level of inadvertent motion is likely to be much lower than for someone holding a camera without any stabilizing features. Therefore, in one embodiment, local minimum may be calculated based on past readings, and may not be an absolute value. In one embodiment, the motion is the weighted motion, as discussed above.

If the motion is at a minimum, at block 445, the indicator shows that it is time to take the picture. In one embodiment, for a visual feedback, the target is shown (FIG. 8A, illustration 840). For an audio feedback, in one embodiment, the chord indicating that the time is good to take a picture is played. In another embodiment, for audio feedback silence indicates that it is a good time to take a picture.

At block 450, the indicator for the level (and in one embodiment type) of motion detected is shown. As shown in FIG. 8A, for example, a number of arrows lit may indicate the level of motion.

In one embodiment, if a level of motion is consistently too high (e.g. the user is exhibiting a tremor or other constant motion), the indicator may further include a suggested remediation for the problem. For example, for a user with a tremor, the system may suggest placing the camera on a surface, or moving the camera at a smooth pace while holding it level, which reduces the effect of tremors, and the rotation of the camera, which has a larger effect on the image quality. The process returns to block 420, to continue receiving motion data and update the feedback to the user. In one embodiment, the process terminates when the camera/camera application is turned off or the user manually terminates the program.

Figure 5:
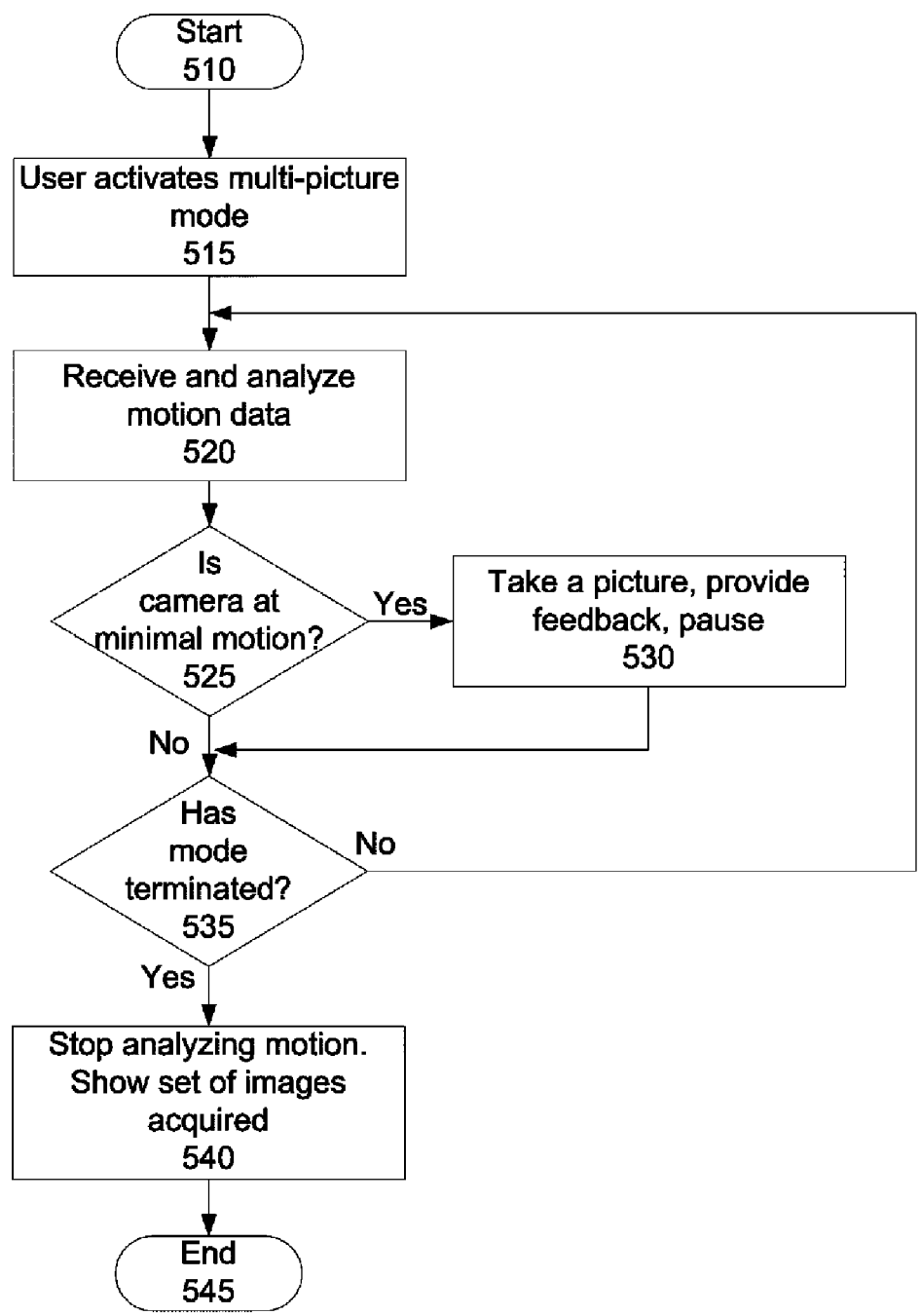
FIG. 5 is a flowchart of one embodiment of using the motion state system to automatically acquire a plurality of images.

FIG. 5 is a flowchart of one embodiment of using the motion state system to take multiple photos without requiring user interaction. In one embodiment, the user may set a number of photos to take. In one embodiment, that number can range from one to a maximum number for which the device has storage capability. This feature may be referred to as multi-picture mode, or party mode.

At block 510, the user activates the multi-picture mode. At block 520, the system receives and analyzes motion data.

At block 525, the process determines whether the camera is at a minimal motion, e.g. in an optimal motion state for acquiring an image. If so, the process continues to block 530.

At block 530, a photo is taken. In one embodiment, feedback is provided to the user, indicating that a photo was taken. In one embodiment, the feedback may be audio feedback, visual feedback, or a combination of the above. In one embodiment, after a picture is taken, the process inserts a pause, so that no additional photo is taken immediately after taking the first picture. For example, once a photo is taken, the system may not take another photo for 5 seconds, even if optimal motion state is maintained or reached again during that time. In one embodiment, no additional photo is taken until the camera has experienced deliberate (e.g. not inadvertent) motion. This means that the user has deliberately moved, or shifted the camera. In one embodiment, no additional photo is taken until a certain distance is traveled. The distance traveled may be in feet, yards, or many miles. In one embodiment, the user may set distances traveled for various types of conveyances (e.g. walking, bicycling, car, etc.) In one embodiment, the user may set the "distance" option and the device may determine the type of travel experienced (e.g.

walking-speed, biking speed, driving speed, or flying speed). This can be determined based on the accelerometer data. In one embodiment, based on this, the camera may automatically take pictures at distance intervals, when the other motion criteria are met. In one embodiment, the user may set preferences as to pauses, motion requirements, distances, etc. between photos being taken.

The process then continues to block 535. If the camera was not found to be at minimal motion, at block 525, the process continues directly to block 535.

At block 535, the process determines whether the mode is terminated. The mode may be terminated when a certain number of pictures have been taken, when a certain amount of time has elapsed, when a user manually terminates the mode, or when some other condition is met. If the mode has not terminated, the process returns to block 520, to continue receiving and analyzing motion data.

If the mode is terminated, the process continues to block 540.

At block 540, the process stops the motion analysis. In one embodiment, the acquired pictures are shown to the user. In one embodiment, a simple interface is shown enabling the user to easily delete those images he or she does not wish to retain. In one embodiment, this may be done before the images are saved, e.g. while they remain in volatile memory. In another embodiment, this is done after the images are saved. The process then ends at block 545. In one embodiment, the photos taken by multi-photo mode may be used to automatically generate a panoramic photo using photo stitching, a time lapse video, a slide show, or a collage. In one embodiment, for slide shows, panoramic, or collages, the images may be stitched together based on the user's direction of motion and when the images were taken.

Figure 6:
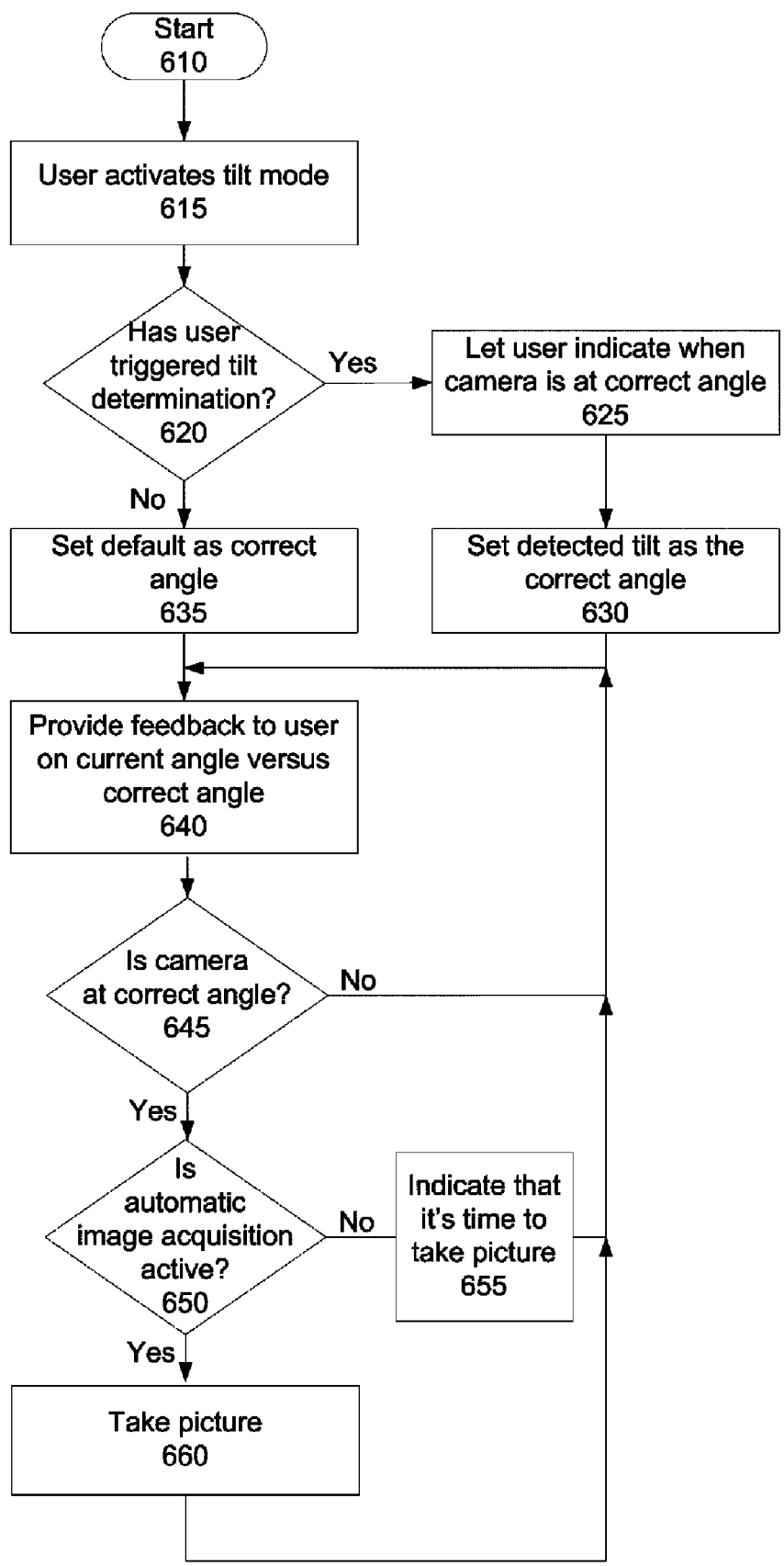
FIG. 6 is a flowchart of one embodiment of using the angle feedback feature.

FIG. 6 is a flowchart of one embodiment of using the tilt feedback feature. The process starts when the user activates tilt mode, at block 615. At block 620, the process determines whether the user has triggered a tilt determination. If so, the process continues to block 625. At block 625, the user can indicate when the camera is at the angle the user wishes to use. In one embodiment, the user may tap a button or otherwise indicate that the device is on a surface which should be considered the correct angle. Note that the correct angle may be at any angle. Thus, for example, the surface for setting the angle may be made by holding the device flat against an object which is at an 80% angle. In one embodiment, after the user clicks to indicate the correct angle, the system takes one or more measurements. In one embodiment, these values are then set as the correct angle, at block 630. The process then returns to block 640.

If, at block 620 the user has not triggered the tilt determination, a default angle is set as the correct angle. In one embodiment, the default is a 180 degree angle (e.g. the camera being held vertically). In another embodiment, the default angle may be the last used angle. In one embodiment, if the default angle is not the vertical/standard angle, the user is notified of this.

At block 640, feedback is provided to the user, in one embodiment. In one embodiment, feedback is provided as noted above via visual indicator, audio indicator, or another form. In one embodiment, a bubble level may be shown. In one embodiment, the angle indicated by the bubble level is with respect to the defined correct angle. In one embodiment, feedback is only provided when the camera is at the correct angle. In another embodiment, no feedback is provided.

At block 645, the process determines whether the camera is at the correct angle. If not, the process returns to block 640, to continue monitoring the motion data, and utilize the motion data to determine a current angle of the device.

If the camera is at the current angle, the process at block 650 determines whether the system is set up for automatic image acquisition. Automatic image acquisition automatically triggers the camera when certain conditions are satisfied. In one embodiment, the condition may be that the camera is at the correct angle.

If automatic image acquisition is active, the process continues to block 660. At block 660, in one embodiment, the system takes a picture. In one embodiment, the system first ensures that any other conditions are met (e.g. there is not excessive motion). The process then returns to block 640 to continue monitoring the motion data.

If the automatic image acquisition is not active, at block 655, in one embodiment, feedback is provided that this is a good time to take a picture. In one embodiment, the feedback may be visual, audio, or other types of feedback. In one embodiment, if feedback is provided on the current angle, as described with respect to block 640, this block is not present. The process then returns to block 640 to continue monitoring motion. In one embodiment, whenever the tilt mode is active, the user interface displays a small icon indicating that it is active. In one embodiment, the user may inactivate the tilt mode by touching the icon.

Figure 7:
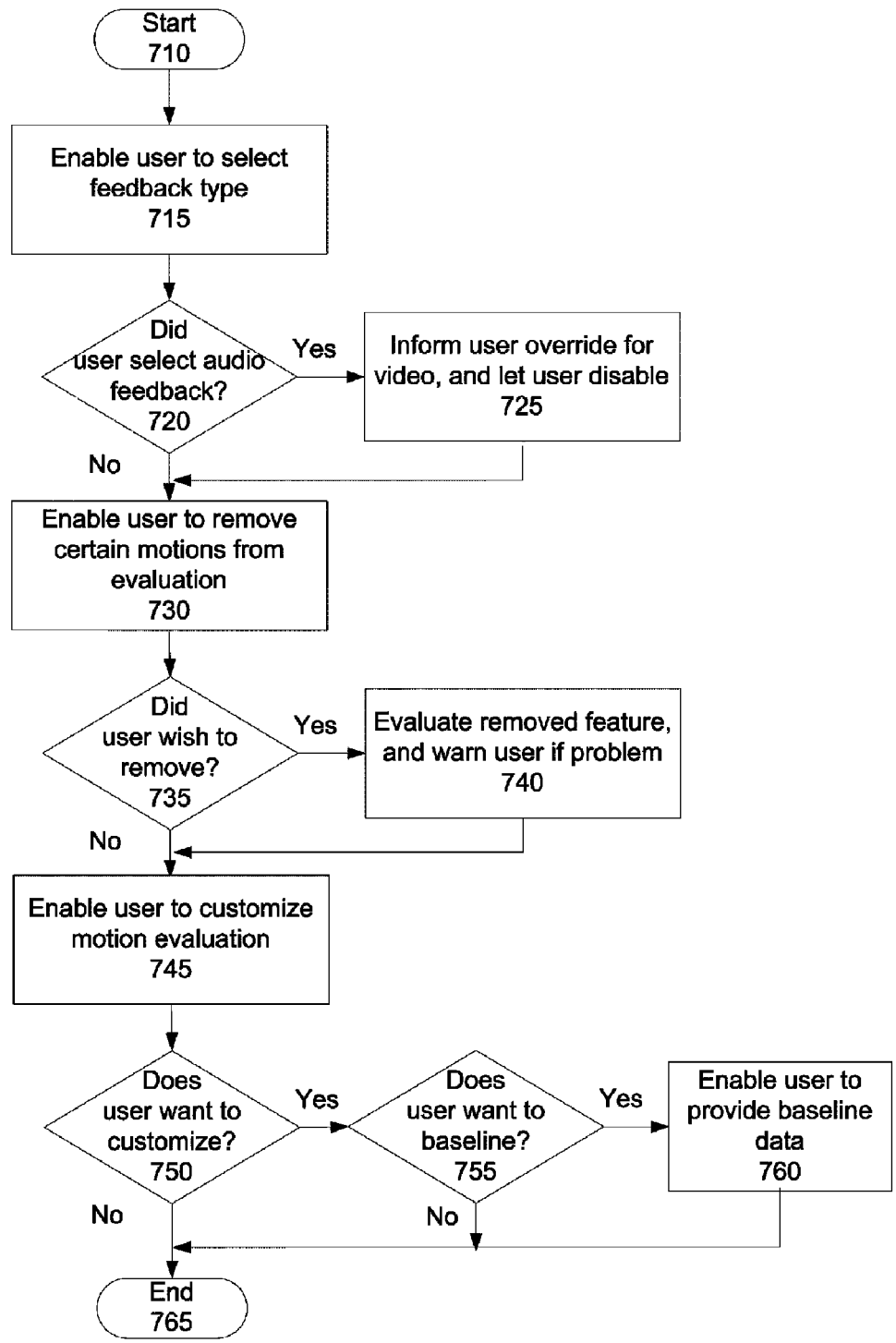
FIG. 7 is a flowchart of one embodiment of user adjustment of the motion state system.

FIG. 7 is a flowchart of one embodiment of user adjustment of the motion state system. In one embodiment, the user may set preferences for the motion feedback. The process starts at block 710. In one embodiment, the process is initiated by the user through a user interface. By selecting settings, or the like, the user can alter the settings of the system.

At block 715, the user can select the feedback type. In general, the two formats of feedback provided are audio feedback and visual feedback. However, other types of feedback may be used.

In one embodiment, if the user selects audio feedback as determined at block 720, the user is informed at block 725, that the preference will be overridden when the user is taking video, since the audio feedback would otherwise be recorded on the video soundtrack. The user can reject this override, or accept it, in one embodiment. The process then continues. In one embodiment, the user may select among multiple types of audio feedback. In one embodiment, the default audio feedback is silence when the motion state indicates a good time to take a picture and a feedback sound—which becomes louder as the level of motion increases. As noted above, this may reflect the weighted motion, based on the likely effect of the motion on the image quality. In one embodiment, the default audio feedback for multi-picture mode is a click—as a photo shutter—for each time an image is acquired. Alternative types of audio feedback may include chords which are varied based on motion state/angle/photo being taken, single tones, beeps, words, or etc.

At block 730, in one embodiment the system enables the user to remove certain motions from evaluation. In one embodiment, the user may remove motions by type (e.g. horizontal motion at a particular speed, rhythmic motion, etc.) In one embodiment, the user may demonstrate the motion. The system would then record the demonstrated motion. In one embodiment, the user is requested to repeat the motion at least once, until the core motion type is identified. If the user removed a feature, the process continues to block 740. At block 740, the removed motion type is evaluated. In one embodiment, if the motion type removed is one that would make the system less effective, the user is warned and can edit or delete the motion state removal. The process then continues.

At block 745, the system enables the user to adjust the evaluation. The user can indicate whether or he she would prefer an adjusted evaluation for "low motion state" or a general low motion state evaluation, at block 750. Human bodies are never perfectly still, and different people have different levels of inadvertent motion. Therefore, for users who may have a higher level of inadvertent motion, adjusting the threshold for "low motion target" is useful. If the user selects an adjusted evaluation, the process continues to block 750.

At block 755, the user may choose to initiate the settings, e.g. provide a baseline for the system. If the user chooses to provide a baseline, the user is asked to hold the camera in a photo taking configuration (in one embodiment, multiple sequential positions) for a period of time (in one embodiment 15 seconds). This provides a baseline for user motion state. In one embodiment, every time the system is used, the motion state data is saved, and used to adjust the user's thresholds. If the user chooses not to provide a baseline, the adjustment is initiated after the first few data points have been received and evaluated.

Figure 8B:
FIG. 8B shows one embodiment of removing motions.

The process then ends. In one embodiment, the user may initiate this evaluation at any time. In one embodiment, the user may initiate the "remove this motion" option from the main camera menu. For example, in one embodiment, the user may tap the visual display showing current motion state. In one embodiment, the system then displays the currently detected types of motion. The user may, in one embodiment, remove one or more of the motion types from evaluation. In one embodiment, when the user clicks on the motion type, a description is provided. In one embodiment, the user may remove one or more of the motion types from the evaluation. FIG. 8B illustrates one embodiment of this feature.

Figure 9:
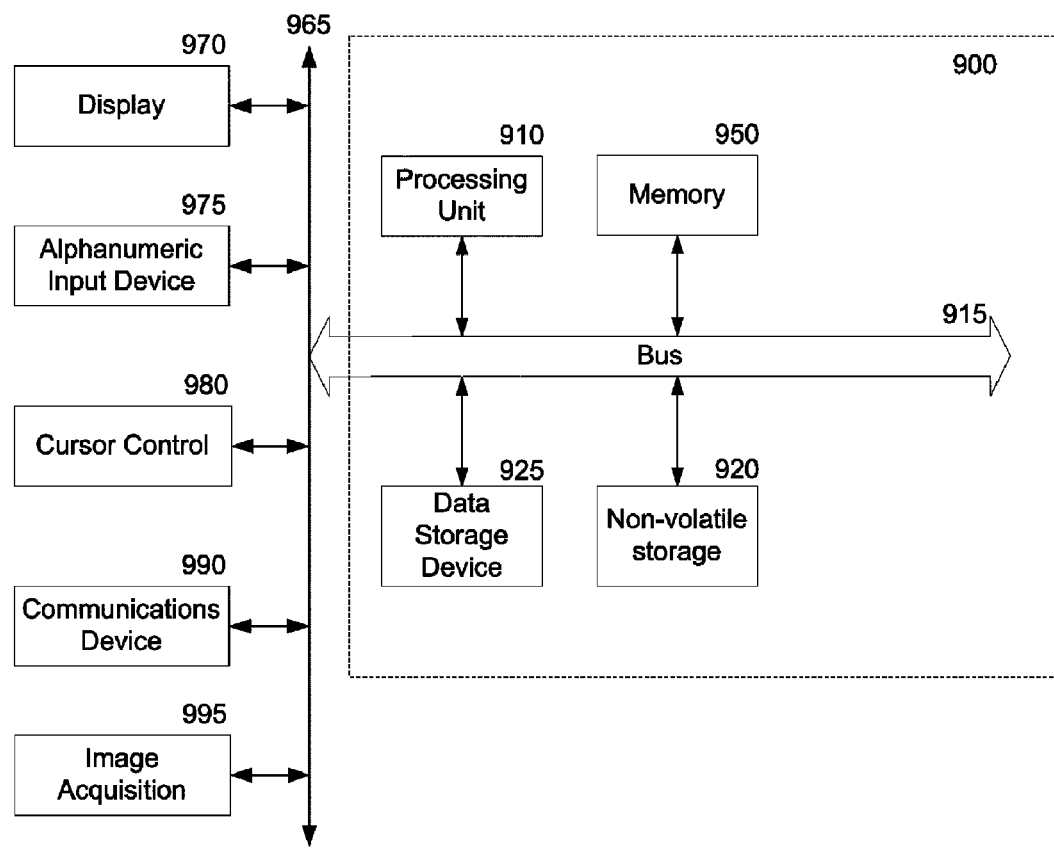
FIG. 9 is a block diagram of a particular computer system which in one embodiment is used with the present invention.

FIG. 9 is a block diagram of a particular computer system to be used in one embodiment of the present invention. It will be apparent to those of ordinary skill in the art, however that other alternative systems of various system architectures may also be used.

The system illustrated in FIG. 9 includes a bus or other internal communication means 915 for communicating information, and a processor 910 coupled to the bus 915 for processing information. The system further comprises a random access memory (RAM) or other volatile storage device 950 (referred to as main memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions. In one embodiment, data storage device 925 is flash memory or other non-volatile storage.

The system may further be coupled to a display device 980, such as a cathode ray tube (CRT) or a liquid crystal display (LCD) coupled to bus 915 through bus 965 for displaying information to a computer user. An alphanumeric input device 985, including alphanumeric and other keys, may also be coupled to bus 915 through bus 965 for communicating information and command selections to processor 910. An additional user input device is cursor control device 980, such as a mouse, a trackball, stylus, touch screen cursor control, or cursor direction keys coupled to bus 915 through bus 965 for communicating direction information and command selections to processor 910, and for controlling cursor movement on display device 980.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments of the present invention.

The control logic or software implementing the present invention is stored in main memory 950, mass storage device 925, or other storage medium locally or remotely accessible to processor 910.

It will be apparent to those of ordinary skill in the art that the system, method, and process described herein is implemented as software stored in main memory 950 or read only memory 920 and executed by processor 910 of the particular computer system. This control logic or software may also be resident on an article of manufacture comprising a computer readable medium having computer readable program code embodied therein and being readable by the mass storage device 925 and for causing the processor 910 to operate in accordance with the methods and teachings herein.

Image acquisition 995 comprises a system to acquire photographic images. In one embodiment, that system may include a CCD camera, or other digital image acquisition means. The acquired image may be stored in RAM 950, and more permanently in static storage 920.

The present invention is embodied in a particular handheld or portable device containing at least a subset of the computer hardware components described above. For example, the handheld device may be configured to contain the bus 915, the processor 910, and memory 950 and/or 925. The handheld device may also be configured to include alternative user input/output mechanisms such as a touch screen, or a selection area.

The present invention is one embodiment is embodied in a special purpose appliance including a subset of the computer hardware components described above as well as an accelerometer, gyroscope, or other motion sensing system. For example, the appliance may include a processor 910, a data storage device 925, a bus 915, and memory 950, and only rudimentary communications mechanisms, such as a small touch-screen that permits the user to communicate in a basic manner with the device.

The control logic or software implementing the present invention can be stored on any machine-readable medium locally or remotely accessible to processor 910. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, electrical, optical, acoustical or other storage mechanisms.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
receiving an indication from a user that the user wishes to take a picture;
receiving motion data for a camera device;
analyzing the motion data, the analyzing comprising:
identifying one or more motion elements included in the motion data;
determining a magnitude and a motion type for each of the one or more motion elements;
calculating a weighted value for each of the one or more motion elements based on that motion element's magnitude and motion type; and
calculating an overall motion level for the camera device based on a combination of the weighted values of the one or more motion elements; and
acting when the overall motion level indicates a low level of the motion.

2. The method of claim 1, wherein a larger weight is given to motion types that are more likely to cause image degradation.

3. The method of claim 1, wherein at least one of the motion types comprises inadvertent motion.

4. The method of claim 1, further comprising:
providing feedback to the user of a motion state of the camera to enable the user to take a picture with an ideal motion state; and
the action comprising the feedback indicating that a good quality picture could be taken.

5. The method of claim 4, wherein the feedback comprises a tone, indicative of the level of inadvertent motion detected.

6. The method of claim 5, wherein an absence of sound indicates the low level of the classified motion.

7. The method of claim 1, wherein the action comprises:
taking a picture automatically when the low level of motion is detected.

8. The method of claim 7, further comprising:
taking a second photo at a second time when the low level of motion is identified, and an additional criterion is met.

9. The method of claim 8, wherein the additional criterion comprises one or more of the following: a certain time has elapsed, a certain amount of motion has been observed, a deliberate motion has been identified, a certain distance has been traveled.

10. The method of claim 1, wherein the motion data is further for determining whether the camera is at a correct angle; and
taking a photo when the camera is at the correct angle.

11. The method of claim 10, further comprising:
enabling a user to set an arbitrary angle as the correct angle.

12. The method of claim 11, wherein setting the correct angle comprises holding the device at the arbitrary angle while activating the tilt determination logic.

13. An improved camera system including a motion acquisition logic, an image acquisition system, and a motion state system, the motion state system comprising:
a motion analyzer to receive motion data from the motion acquisition logic, and to analyze the motion data, wherein to analyze the motion data, the motion analyzer:
separates the motion data into a plurality of motion elements;
determines a magnitude and a motion type for each of the plurality of motion elements;
calculates a weighted value for each of the plurality of motion elements based on that motion element's magnitude and motion type; and
calculates an overall motion level for the camera system based on a combination of the weighted values of the plurality of motion elements; and
a feedback logic to provide user feedback regarding an identified overall motion level.

14. The system of claim 13, wherein a larger weight is given to motion types that are more likely to cause image degradation.

15. The system of claim 13, wherein at least one of the motion types comprises inadvertent motion.

16. The system of claim 13, wherein feedback logic is to provide feedback to the user of a motion state of the camera to enable the user to take a good quality picture.

17. The system of claim 13, further comprising:
an automatic image acquisition logic to automatically take a picture when the level of motion is low, and wherein the feedback logic provides feedback when an image is acquired.

18. The system of claim 13, further comprising:
a tilt logic to determine when the device is at a correct angle.

19. An improved camera system comprising:
an accelerometer to sense motion in a camera device;
a motion analyzer to perform the following:
identify one or more motion elements included in the motion;
determine a magnitude and a motion type for each of the one or more motion elements;
calculate a weighted value for each of the one or more motion elements based on that motion element's magnitude and motion type; and
calculate an overall motion level for the camera device based on a combination of the weighted values of the one or more motion elements; and
an action logic to perform an action based on an identified overall motion.

20. The system of claim 19, wherein the action logic comprises a feedback logic to generate feedback indicating the overall motion level.

21. The system of claim 20 wherein the feedback logic comprises one or more of: a visual feedback generator, an audio feedback generator.

22. The system of claim 19, wherein the action logic comprises an automatic image acquisition logic to automatically take a picture when the level of motion is low.

23. The system of claim 19, further comprising:
a tilt logic to determine whether a current angle of the device corresponds to a correct angle.

* * * * *